(12) United States Patent
Schmitt et al.

(10) Patent No.: US 10,232,688 B2
(45) Date of Patent: Mar. 19, 2019

(54) VEHICLE DOOR LATCH REINFORCEMENT ASSEMBLY

(71) Applicant: Honda Motor Co., Ltd., Tokyo (JP)

(72) Inventors: Matthew W. Schmitt, Hilliard, OH (US); Nathan D. Roy, Marysville, OH (US); Robert H. Bator, Marysville, OH (US); Kozo Kusumoto, Dublin, OH (US); Christopher J. Mampe, Delaware, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/465,641

(22) Filed: Mar. 22, 2017

(65) Prior Publication Data

US 2018/0272844 A1  Sep. 27, 2018

(51) Int. Cl.
 *E06B 3/00* (2006.01)
 *B60J 5/04* (2006.01)

(52) U.S. Cl.
 CPC ................... *B60J 5/0433* (2013.01)

(58) Field of Classification Search
 CPC ...................................... B60J 5/0433
 USPC ........................................................... 49/501
 See application file for complete search history.

(56) References Cited

U.S. PATENT DOCUMENTS

| | | | | |
|---|---|---|---|---|
| 5,364,157 A * | 11/1994 | Siedlecki | ................. | B60J 5/043 296/146.6 |
| 5,573,297 A * | 11/1996 | DeRees | ................... | B60J 5/0412 296/146.6 |
| 6,557,913 B1 | 5/2003 | Kunst | | |
| 6,779,829 B2 * | 8/2004 | Chappuis | ................ | B60J 5/0427 296/146.5 |
| 7,140,674 B2 * | 11/2006 | Miyoshi | ................. | B62D 25/04 296/203.03 |
| 8,186,743 B2 * | 5/2012 | Anderson | ................... | B60J 5/06 296/146.6 |
| 8,511,740 B2 * | 8/2013 | Anderson | ................... | B60J 5/06 296/146.6 |
| 9,938,758 B2 * | 4/2018 | Fuetterer | ................ | E05D 5/0207 |
| 2003/0116979 A1 | 6/2003 | Arquevaux et al. | | |
| 2016/0123057 A1 * | 5/2016 | Mildner | ................. | B60J 5/0431 296/146.11 |

FOREIGN PATENT DOCUMENTS

| | | | |
|---|---|---|---|
| CN | 104395543 | | 3/2015 |
| DE | 10339307 | B3 * | 12/2004 |
| DE | 102010053957 | A1 * | 6/2012 |
| DE | 102012025392 | B3 * | 2/2014 |

(Continued)

*Primary Examiner* — Jerry E Redman
(74) *Attorney, Agent, or Firm* — Rankin, Hill & Clark LLP

(57) ABSTRACT

A door latch reinforcement assembly includes a base member including a main wall portion extending laterally from an inboard side of an associated vehicle door to an outboard side of the associated vehicle door and an outboard flange portion extending from an outboard end of the main wall portion along the outboard side of the associated vehicle door. The door latch reinforcement assembly can include a stiffener overlaid onto the main wall portion to reinforce the base member. The assembly can include at least one notch extending into the main wall portion from an inboard end of the main wall portion to define the main wall portion into at least two fingers having distal ends.

15 Claims, 2 Drawing Sheets

(56) References Cited

FOREIGN PATENT DOCUMENTS

| | | |
|---|---|---|
| DE | 102014115704 | 3/2016 |
| EP | 1323560 | 7/2003 |
| EP | 1405746 A2 * | 4/2004 |
| EP | 1510385 A1 * | 3/2005 |
| EP | 3127731 A1 * | 2/2017 |
| FR | 3016143 A1 * | 7/2015 |
| GB | 2321920 | 8/1998 |
| WO | 2016050233 | 4/2016 |

* cited by examiner

VEHICLE DOOR LATCH REINFORCEMENT ASSEMBLY

BACKGROUND

A conventional vehicle door for ingress and egress with the vehicle's passenger compartment is hinged at one end (e.g., the forward end). At the other end (e.g., at the rearward end), a latch assembly is provided for selectively latching and locking onto a striker provided on the vehicle body for securing and locking the vehicle door. The area of the door at which the latch assembly is provided (i.e., latch area) typically can receive increased stresses over the life of the vehicle. Often, local "patches" or reinforcements are applied to the door structure at this latch area in order to reinforce the latch area for purposes of durability, reliability, and ultimate strength of the latch mounting area. These patches are typically formed of stamped steel or aluminum of various thicknesses. The typical latch area patch primarily functions to locally reinforce the latch mating surface of the door structure.

BRIEF DESCRIPTION

According to one aspect, a reinforcement assembly for a vehicle door includes a base member including a main wall portion extending laterally from an inboard side of the vehicle door to an outboard side of the vehicle door and an outboard flange portion extending from an outboard end of the main wall portion along the outboard side of the vehicle. The reinforcement assembly further includes a stiffener overlaid onto the main wall portion to reinforce the base member.

According to another aspect, a vehicle door reinforcement assembly includes a base member having a main wall portion and an outboard flange portion. The outboard flange portion angularly extends from an outboard end of the main wall portion for deflecting any intruding objects away from a latch area of an associated vehicle door. The vehicle door reinforcement assembly further includes at least one notch extending into the main wall portion to define the main wall portion into at least two fingers having distal ends.

According to a further aspect, a door latch reinforcement assembly includes a base member including a main wall portion extending laterally from an inboard side of an associated vehicle door to an outboard side of the associated vehicle door and an outboard flange portion extending from an outboard end of the main wall portion along the outboard side of the associated vehicle door. The door latch reinforcement assembly further a stiffener overlaid onto the main wall portion to reinforce the base member and optionally at least one notch extending into the main wall portion from an inboard end of the main wall portion to define the main wall portion into at least two fingers having distal ends.

DETAILED DESCRIPTION

Figure 2:
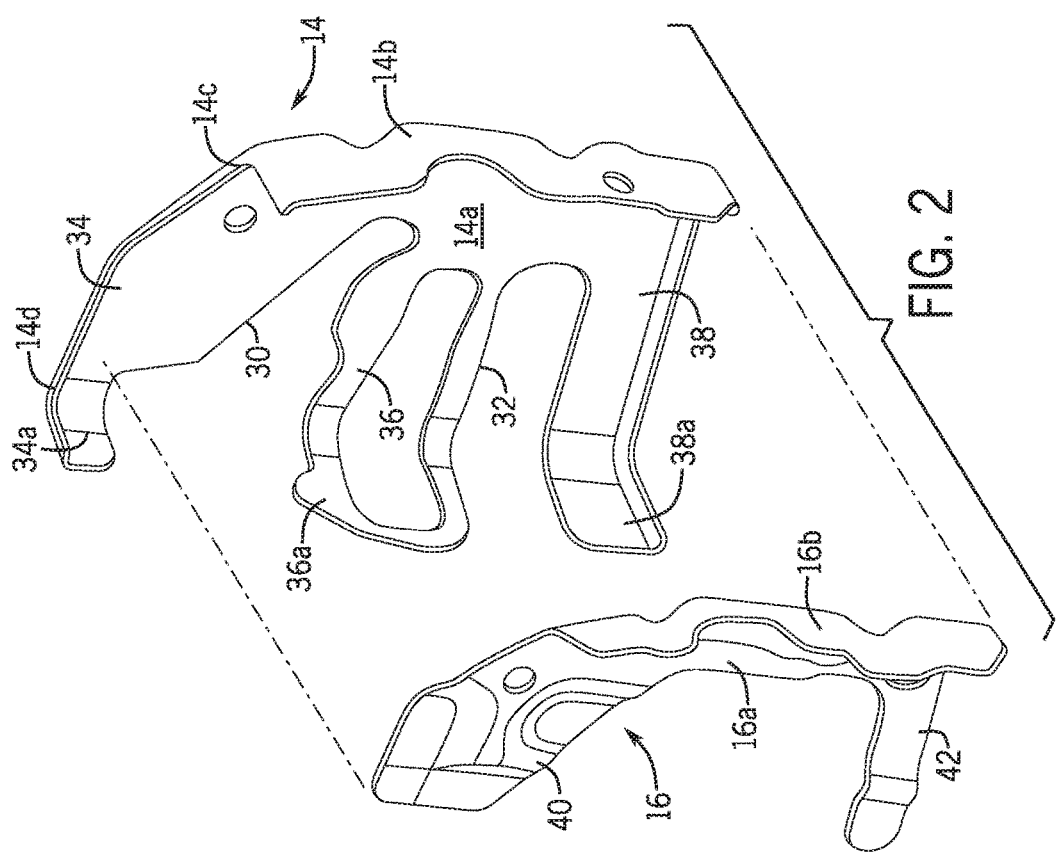
FIG. 2 is an exploded perspective view of the reinforcement assembly of FIG. 1 showing a base member and a stiffener.
Figure 1:
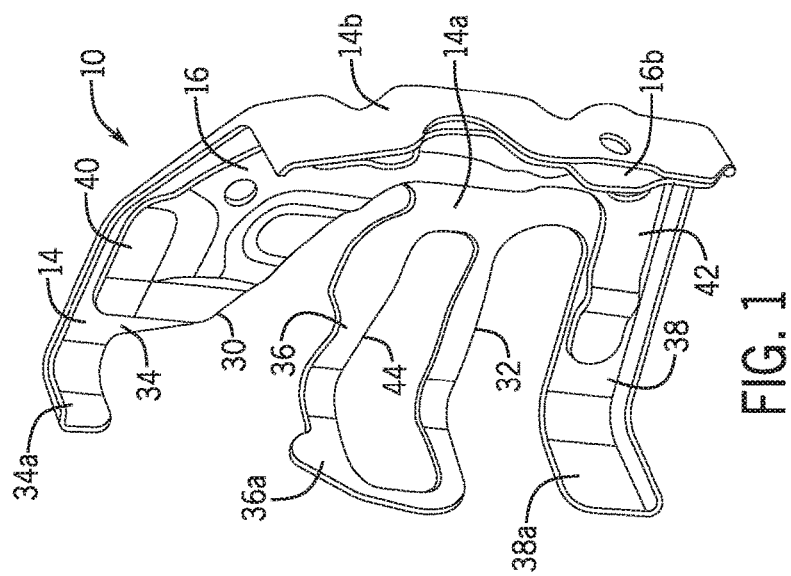
FIG. 1 is a perspective view of a reinforcement assembly for a vehicle door according to an exemplary embodiment.

Referring now to the drawings wherein the showings are for purposes of illustrating one or more exemplary embodiments and not for purposes of limiting the same, FIG. 1-4 show a vehicle door latch reinforcement assembly 10 for reinforcing a vehicle door 12 (shown in FIGS. 3-4 only) according to an exemplary embodiment. The vehicle door 12, which can also be referred to herein as an associated vehicle door and thus not necessarily includes as part of the reinforcement assembly, can be a vehicle door disposed on the side of a vehicle (not shown) for providing ingress and egress for the vehicle's passenger compartment (also not shown). The vehicle door 12 can be hingedly attached, such as at its forward end, to the vehicle for hinged opening and closing as is known and understood by those skilled in the art. An opposite end, such as the door's rearward end, can be selectively latchable and lockable to the vehicle door frame (not shown) by a door latch assembly 26 as is also known and understood by those skilled in the art.

The reinforcement assembly 10 of the illustrated embodiment includes a base member 14 and a stiffener 16. The base member 14 includes or has a main wall portion 14a and an outboard flange portion 14b. The outboard flange portion 14b angularly extends from an outboard end 14c of the main wall portion 14a in a first direction away from the main wall portion for deflecting any intruding objects away from a latch area 18 of the vehicle door 12. Intruding objects could be those thrust or moving toward the door latch assembly 26 during a side impact collision (e.g., another vehicle). More specifically and with specific reference to FIG. 3, the main wall portion 14a extends laterally from an inboard side of the vehicle door 12 to an outboard side of the vehicle door 12. The outboard flange portion 14b extends from the outboard end 14c of the main wall portion 14a along the outboard side of the vehicle door 12 for deflecting any such intruding objects away from the latch area 18 of the vehicle door 12.

Figure 3:
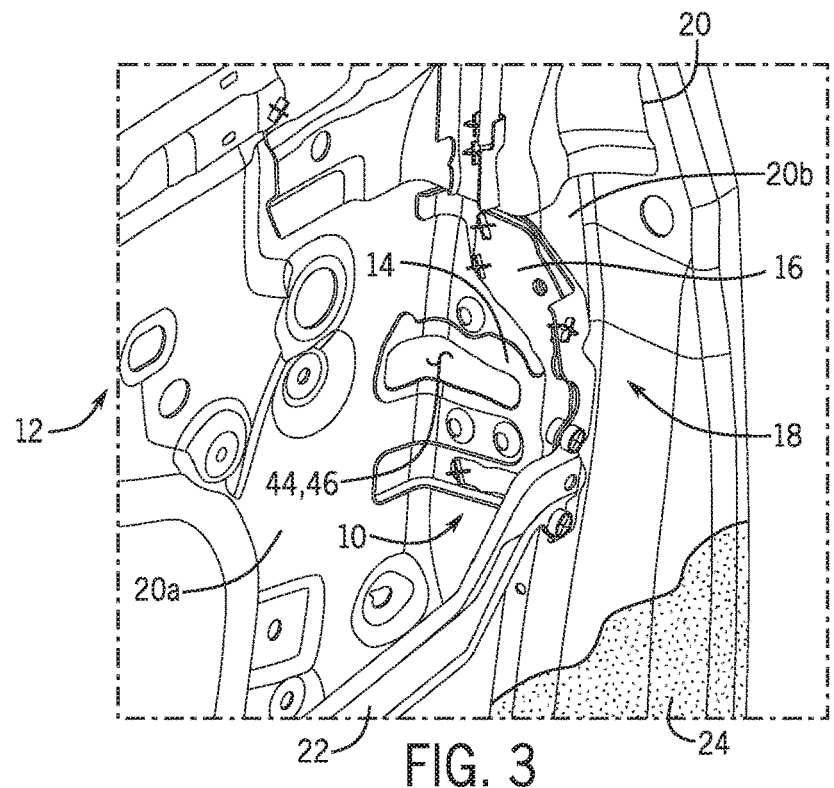
FIG. 3 is a partial perspective view showing the reinforcement assembly mounted onto a vehicle door.
Figure 4:
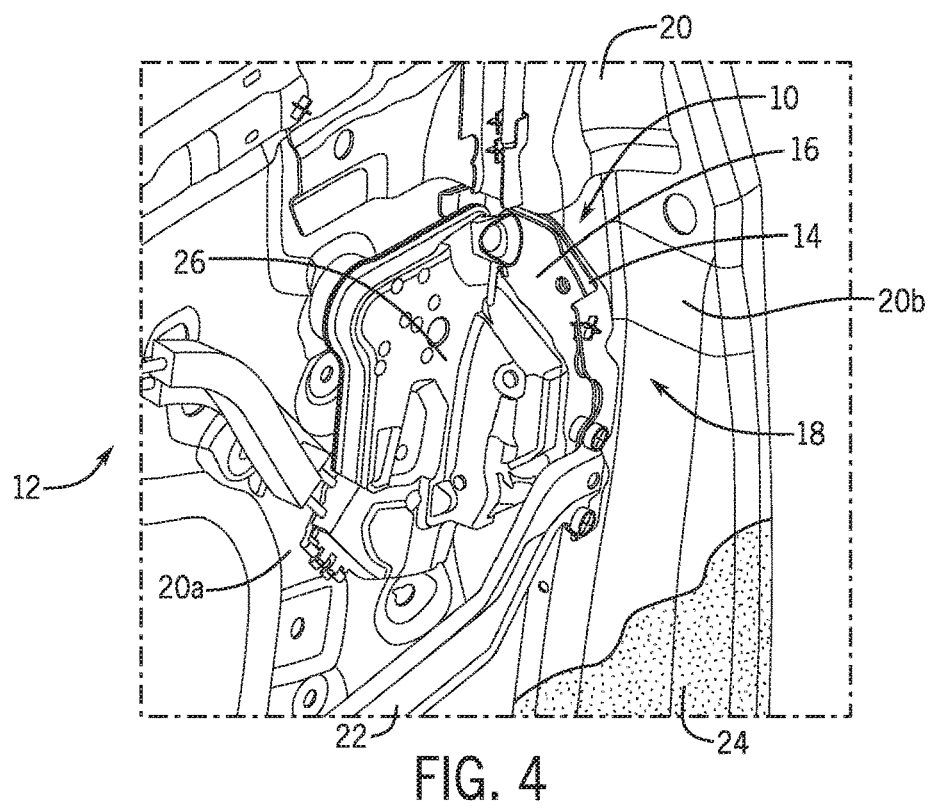
FIG. 4 is a partial perspective view similar to FIG. 3 but showing a latch assembly mounted to the vehicle door at the location of the reinforcement assembly.

Referring to FIGS. 3 and 4, the vehicle door 12 can be constructed of an inner frame 20 having an inner wall 20a defining the inboard side of the vehicle door 12 and a lateral wall portion 20b extending laterally away from the inner wall 20a. The vehicle door 12 can further include a reinforcement bar 22 extending longitudinally (i.e., in a direction between the forward and rearward ends of the vehicle door 12) and a door skin 24 overlaying the reinforcement bar 22 and the inner frame 20 to define the outboard side of the vehicle door 12 and form the vehicle door 12 as a closed construction. Mounting of the reinforcement assembly 10 to the vehicle door 12 will be described in further detail below. The inner frame 20 can formed of stamped steel or aluminum. The reinforcement bar 22 can be an extruded steel or aluminum member that imparts strength to the vehicle door 12, particularly for side impact collisions into the vehicle door 12. The door skin 24 can be formed of a sheet of steel or some other material.

The stiffener 16 is overlaid onto the main wall portion 14a of the base member 14 to reinforce the base member 14. In particular, the stiffener 16 is overlaid and secured onto the main wall portion 14a on a side thereof that is opposite a side of the main wall portion 14a that is mounted against the lateral portion 20b of the inner frame 20 of the vehicle door 12. As shown, the stiffener 16 can include or has a stiffener main wall portion 16a and a stiffener outboard flange portion 16b. Specifically, the stiffener main wall portion 16a overlays and mates against the main wall portion 14a of the base member 14 and the stiffener outboard flange portion 16b overlays and mates against the outboard flange portion 14b of the base member 14. For securing the stiffener 16 to the base member 14, the stiffener 16 can be welded to the base member 14. In particular, the stiffener main wall portion 16a can be welded to the main wall portion 14a and the stiffener outboard flange portion 16b can be welded to the outboard flange portion 14b.

The reinforcement assembly 10 can further include at least one notch (e.g., notches 30, 32) extending into the main wall portion 14a of the base member 14 to define the main wall portion 14a into at least two fingers (e.g., fingers 34, 36, 38) having distal ends (e.g., 34a, 36a, 38a). In particular, the at least one notch can extend into the main wall portion 14a of the base member 14 from an inboard end 14d of the main wall portion 14a toward the outboard end 14c of the main wall portion 14a. In the illustrated embodiment, the at least one notch defines the main wall portion 14a into at least two fingers having distal ends at or adjacent the inboard side of the vehicle door 12. In particular, in the illustrated embodiment, the at least one notch includes two notches 30, 32 and the at least two fingers includes three fingers 34, 36, 38 having, respectively, distal ends 34a, 36a, 38a.

The stiffener 16 can also include stiffener fingers or finger portions (e.g., stiffener fingers 40, 42). Specifically, the stiffener 16 can have stiffener fingers 40, 42 overlaying the at least two fingers of the main wall portion 14a so as to flank the at least one notch. In the illustrated embodiment, the stiffener 16 has two stiffener fingers 40, 42 overlaying only outer ones 34, 38 of the three fingers 34, 36, 38 of the main wall portion 14a (i.e., stiffener finger 40 overlays finger 34 and stiffener finger 42 overlays finger 36 with no stiffener finger overlaying the central finger 34).

As shown, each of the at least two fingers of the main wall portion 14a can include an inboard flange portion (e.g., the distal ends 34a, 36a, 38a are formed of inboard flange portions) with each inboard flange portion extending along the inboard side of the vehicle door 12. That is, the distal ends 34a, 36a, 38a can be formed as inboard flange portions, also referred to herein as distal flanges, angularly extending and oriented relative to the main wall portion 14a and extending from the main wall portion 14a in the same direction as the outboard flange portion 14b. The central one 36 of the three fingers 34, 36, 38 can have a striker aperture 44 defined therein for receiving an associated striker (e.g., a U-shaped striker mounted to the door frame, not shown) therein when the vehicle door 12 is closed. Thus, the stiffener main wall portion 16a includes the stiffener fingers 40, 42 that extend along and can be welded to the at least two fingers (e.g., fingers 34, 38 of the main wall portion 14a).

While in the illustrated embodiment, the reinforcement assembly 10 includes both the stiffener 16 overlaid onto the main wall portion 14a of the base member 14 to reinforce the base member 14 and includes the at least one notch extending into the main wall portion 14a from the inboard end 14d of the main wall portion 14a to define the main wall portion 14a into at least two fingers having distal ends, the reinforcement assembly 10 can alternatively be configured such that it includes at least one of, and possibly only one of: the stiffener 16 overlaid onto the main wall portion 14a to reinforce the base member 14 or the at least one notch extending into the main wall portion 14a from the inboard end 14d of the main wall portion 14a to define the main wall portion 14a into at least two fingers having distal ends.

The reinforcement assembly 10 can be mounted to the vehicle door 12 as shown in FIGS. 3 and 4. In particular, the base member 14 can be welded or otherwise secured to the vehicle door 12 such that the striker aperture 44 is in registry with a door striker aperture 46 defined by the inner frame 20 of the vehicle door 12. The door latch assembly 26 can also be mounted to the vehicle door 12, and particularly to the inner frame 20, at the latch area 18. As is known and understood, the door latch assembly 26 can selectively latch and selectively lock onto the striker when the striker is received through the apertures 44, 46.

Advantageously, by including the outboard flange portion 14b and/or the stiffener 16 having the stiffener outboard flange portion 16b overlaid onto the outboard flange portion 14b, the reinforcement assembly 10 can deter ingress of adjacent door components into the latch area 18 of the vehicle door 12 (e.g., during a collision event). Such deterrence of ingress promotes robustness and serves to maintain latch integrity. Additionally, the reinforcement assembly 10 reinforces the vehicle door 12, and particularly the inner frame 20 thereof, at the latch area 18. This occurs by providing a locally thickened door structure.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A reinforcement assembly for a vehicle door, comprising:
   a base member including a main wall portion extending laterally from an inboard side of the vehicle door to an outboard side of the vehicle door and an outboard flange portion extending from an outboard end of the main wall portion along the outboard side of the vehicle door; and
   a stiffener including a laterally extending stiffener main wall portion overlaid onto the main wall portion to reinforce the base member,
   wherein a pair of notches extend into the main wall portion of the base member from an inboard end of the main wall portion toward the outboard end of the main wall portion, the notches define the main wall portion into three fingers having distal ends at or adjacent the inboard side of the vehicle door.

2. The reinforcement assembly of claim 1 wherein the stiffener includes a stiffener outboard flange portion that overlays the outboard flange portion of the base member.

3. The reinforcement assembly of claim 1 wherein the stiffener is welded to the base member.

4. The reinforcement assembly of claim 1 wherein the stiffener has stiffener fingers overlaying at least two fingers of the main wall portion so as to flank at least one of the notches.

5. The reinforcement assembly of claim 4 wherein at least two fingers of the main wall portion include an inboard flange portion extending along the inboard side of the vehicle door.

6. The reinforcement assembly of claim 1 wherein the stiffener has stiffener fingers overlaying only outer ones of the three fingers of the main wall portion.

7. The reinforcement assembly of claim 6 wherein the central one of the three fingers has a striker aperture defined therein for receiving an associated striker therein when the vehicle door is closed.

8. A vehicle door reinforcement assembly, comprising:
   a base member having a main wall portion extending laterally from an inboard side to an outboard side of an associated vehicle door and an outboard flange portion, the outboard flange portion angularly extending from an outboard end of the main wall portion for deflecting any intruding objects away from a latch area of the associated vehicle door; and a pair of notches extending into the main wall portion to define the main wall portion into three fingers having distal ends, wherein one of the three fingers has a striker aperture defined therein for receiving an associated striker therein when the associated vehicle door is closed.

9. The vehicle door reinforcement assembly of claim 8 further including:

a stiffener secured to the base member to reinforce the base member.

10. The vehicle door reinforcement assembly of claim 9 wherein the stiffener includes a stiffener main wall portion that is welded to the main wall portion of the base member and a stiffener outboard flange portion that is welded to the outboard flange portion of the base member.

11. The vehicle door reinforcement assembly of claim 10 wherein the stiffener main wall portion includes fingers extending along and welded to at least two fingers of the main wall portion.

12. The vehicle door reinforcement assembly of claim 8 wherein at least two fingers of the main wall portion include a distal flange disposed at the distal end, the distal flange angularly oriented relative to the main wall portion and extending from the main wall portion in the same direction as the outboard flange portion.

13. The vehicle door reinforcement assembly of claim 8 further including a stiffener welded to the base member, the stiffener including stiffener finger portions overlaying outer ones of the three fingers of the main wall portion.

14. A door latch reinforcement assembly, comprising:

a base member including a main wall portion extending laterally from an inboard side of an associated vehicle door to an outboard side of the associated vehicle door and an outboard flange portion extending from an outboard end of the main wall portion along the outboard side of the associated vehicle door; and a stiffener conforming in shape to the base member and including a laterally extending stiffener main wall portion overlaid onto the main wall portion of the base member and a stiffener outboard flange portion overlaid onto the outboard flange portion of the base member to reinforce the base member; and a pair of notches extending into the main wall portion from an inboard end of the main wall portion to define the main wall portion into three fingers having distal ends at or adjacent the inboard side of the associated vehicle door.

15. The door latch reinforcement assembly of claim 14 wherein the stiffener includes stiffener fingers overlaid onto at least two fingers of the main wall portion.

\* \* \* \* \*